US009970223B2

(12) United States Patent
Hall et al.

(10) Patent No.: US 9,970,223 B2
(45) Date of Patent: May 15, 2018

(54) ARTICULATING PROP

(71) Applicants: David R. Hall, Provo, UT (US); Stephen R. Hall, Draper, UT (US); Christopher Johnson, Provo, UT (US); Eric Magleby, Provo, UT (US)

(72) Inventors: David R. Hall, Provo, UT (US); Stephen R. Hall, Draper, UT (US); Christopher Johnson, Provo, UT (US); Eric Magleby, Provo, UT (US)

( * ) Notice: Subject to any disclaimer, the term of this patent is extended or adjusted under 35 U.S.C. 154(b) by 0 days. days.

(21) Appl. No.: 15/156,547

(22) Filed: May 17, 2016

(65) Prior Publication Data

US 2017/0335610 A1 Nov. 23, 2017

(51) Int. Cl.

| | |
|---|---|
| ***B62D 25/12*** | (2006.01) |
| ***E05D 3/06*** | (2006.01) |
| ***E05D 11/10*** | (2006.01) |

(52) U.S. Cl.

CPC ............... *E05D 3/06* (2013.01); *B62D 25/12* (2013.01); *E05D 11/10* (2013.01); *E05Y 2900/536* (2013.01); *E05Y 2900/548* (2013.01)

(58) Field of Classification Search

CPC E05D 3/06; E05D 11/10; B62D 25/12; E05Y 2900/536; E05Y 2900/548; E60R 21/38

USPC ........................................................ 180/69.2

See application file for complete search history.

(56) References Cited

U.S. PATENT DOCUMENTS

| | | | | | |
|---|---|---|---|---|---|
| 2,091,673 | A * | 8/1937 | De Orlow | E05D 3/145 | 16/358 |
| 2,193,111 | A * | 3/1940 | Peterson | E05B 83/247 | 16/293 |
| 2,698,957 | A * | 1/1955 | Vigmostad | E05D 3/16 | 16/302 |
| 2,720,676 | A * | 10/1955 | Vigmostad | E05D 3/16 | 16/289 |
| 2,956,303 | A * | 10/1960 | Fiedler | E05D 3/06 | 16/288 |
| 2,987,753 | A * | 6/1961 | Krause | E05D 3/06 | 16/288 |
| 3,351,975 | A * | 11/1967 | Goto | E05D 3/06 | 16/288 |
| 4,069,550 | A * | 1/1978 | Silk | E05D 3/022 | 16/361 |
| 4,382,312 | A * | 5/1983 | Liggett | E05D 3/06 | 16/288 |
| 6,193,300 | B1 * | 2/2001 | Nakatomi | B60J 7/205 | 296/107.08 |
| 6,345,679 | B1 * | 2/2002 | Sasaki | B60R 21/38 | 180/271 |

(Continued)

*Primary Examiner* — James A Shriver, II
*Assistant Examiner* — Brian L Cassidy

(57) ABSTRACT

An articulating prop to prop panels in an open position is disclosed. In one embodiment, the prop includes a protrusion that rests in a groove to lock members of the articulating prop in position. An external force causes the articulating prop members to rotate into a locked position. In another embodiment, an additional latch is disclosed which further locks the articulating prop in a locked position. An external force causes the articulating prop member to rotate out of a locked position. Shapes and interfaces of handles of the articulating prop are disclosed. Openings and pivotal axes of members of the articulating prop are also disclosed herein.

18 Claims, 13 Drawing Sheets

(56) References Cited

U.S. PATENT DOCUMENTS

| | | | | |
|---|---|---|---|---|
| 6,892,843 | B2 * | 5/2005 | Schillaci | E05C 17/24 180/274 |
| 7,093,877 | B2 * | 8/2006 | Duffy | E05D 3/16 296/76 |
| 7,766,411 | B2 * | 8/2010 | Wegener | B60J 7/1265 296/107.08 |
| 7,845,053 | B2 * | 12/2010 | Marsh | E05D 11/06 16/286 |
| 7,926,603 | B2 * | 4/2011 | Bonsen | B62D 25/12 180/69.21 |
| 2004/0088826 | A1 * | 5/2004 | Schlegel | E05D 3/145 16/366 |
| 2010/0096202 | A1 * | 4/2010 | Bonsen | B62D 25/12 180/69.21 |
| 2012/0139296 | A1 * | 6/2012 | Wilkens | E05B 83/243 296/193.11 |
| 2016/0144822 | A1 * | 5/2016 | Kim, II | B60R 21/34 16/222 |
| 2016/0258196 | A1 * | 9/2016 | Yamamoto | E05D 15/46 |
| 2017/0113648 | A1 * | 4/2017 | Kim, II | B60R 21/38 |

* cited by examiner

Fig. 1A
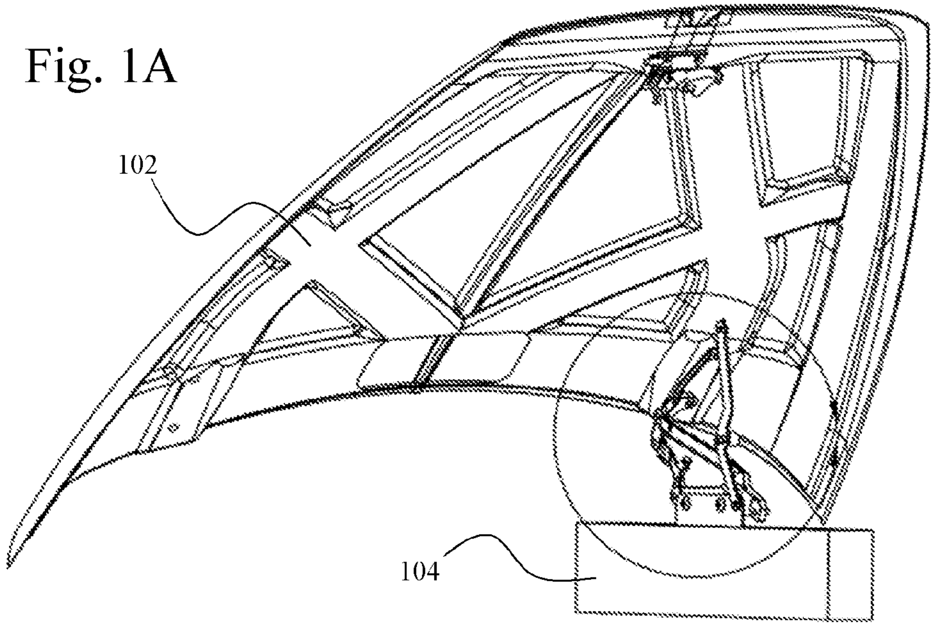
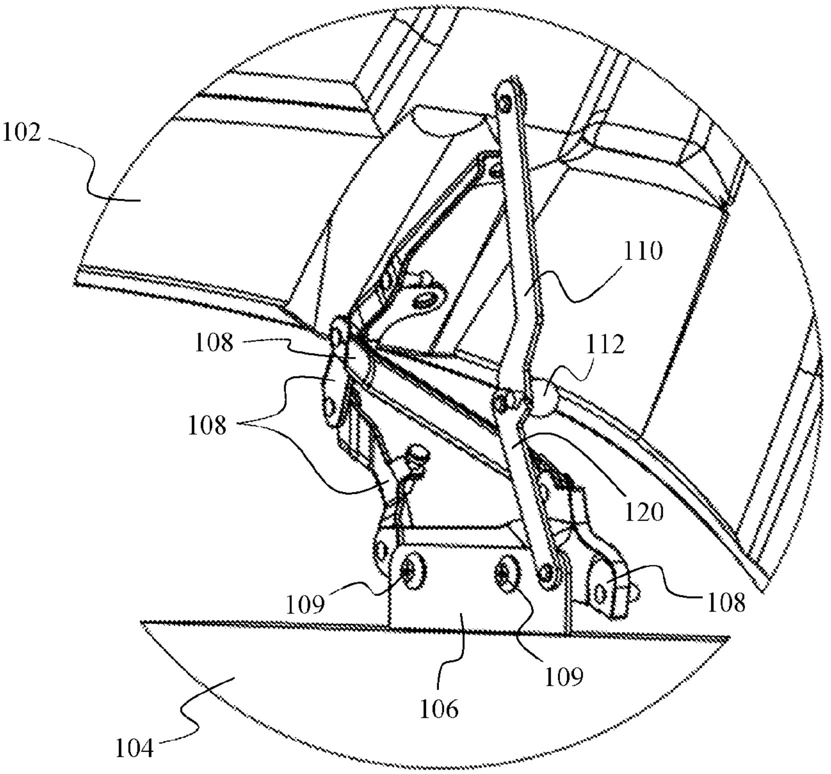
Fig. 1B

Fig. 2A
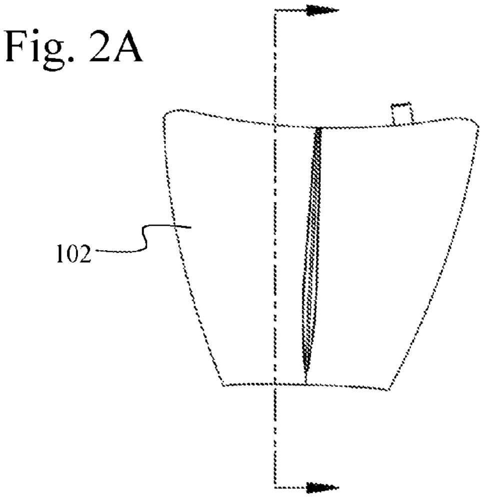
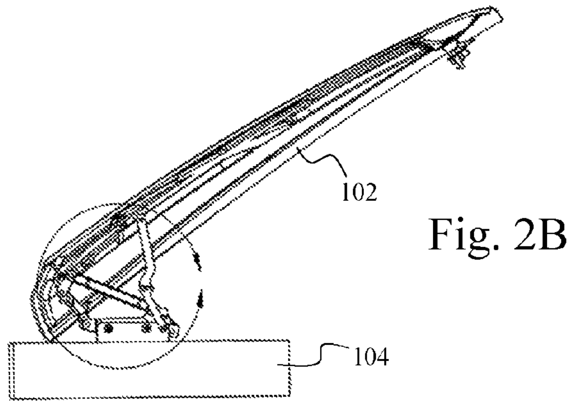
Fig. 2B
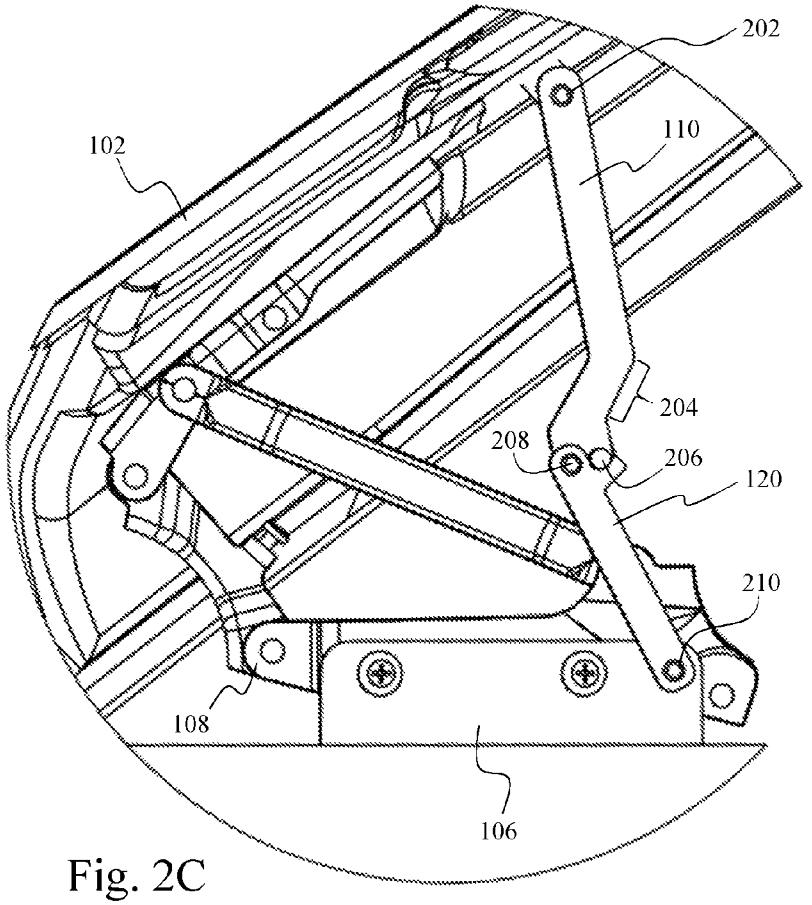
Fig. 2C

ARTICULATING PROP

BACKGROUND

Field of the Invention

This invention relates to apparatuses used to prop panels in an open position relative to one another.

Background of the Invention

Vehicle panels, and especially vehicle hoods, tend to be heavy due to their composition. Although a composition of heavy materials can serve to increase rigidity and safety factors in vehicles, some vehicles require a material composition that prioritize lightweight design instead. Vehicle panels of a lightweight composition impose smaller stresses on props and hinges, which in turn may also be made lighter, thereby increasing a vehicle's fuel efficiency.

Closure panel props are an apparatus used to make opening and propping a panel easier for a vehicle user. Thus, panel props must be of an intuitive, user-friendly design. The current art contains many solutions ranging in complexity and size from long rods to systems of hinges and sliding components. Rods, although reliable, tend to be heavy and require space sufficient to store the entire length of the rod. Systems of hinges, as they increase in complexity, are prone to wear or reduced performance caused by debris. Sliding components are especially prone to reduced performance caused by debris entering small spaces wherein components slide past one another.

Commercial vehicles tend to utilize props which can be produced cheaply at high production rates and quantities. However, vehicles produced at low rates or quantities must utilize more practical manufacturing methods that allow props of sufficient quality to be manufactured. Traditional methods, such as casting or forging, require high initial tooling costs which can only be recovered after high quantity product output. Thus there is a need in the art for a vehicle closure panel prop which is simple, light-weight, intuitive to the user, and producible at low quantities.

SUMMARY

This invention has been developed in response to the present state of the art and, in particular, in response to the problems and needs in the art that have not yet been fully solved by currently available systems and methods. Accordingly, an articulating prop has been developed. Features and advantages of the invention will become more fully apparent from the following description and appended claims.

Consistent with the foregoing, an articulating prop is disclosed. Two members are provided that share an axis of rotation. When the angle between columns exceeds a certain magnitude about the axis of rotation, a propping apparatus is provided that allows the two members to lock in position relative to one another. In one embodiment, the articulating prop utilizes a protrusion mating with a groove to lock members in position. In another embodiment, a latch is added to the first embodiment to further lock members in position.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIGS. 1A and 1B show a perspective view of an articulating prop used in conjunction with a separate hinge assembly between a vehicle hood and a vehicle chassis;

FIG. 2A is a top-down view of a vehicle hood utilizing an articulating prop;

FIGS. 2B and 2C are cross-sectional views of the vehicle hood utilizing an articulating prop of FIG. 2A;

FIG. 6 shows an exploded view of components of which members and axes of the articulating prop are comprised of;

DETAILED DESCRIPTION

Figure 3:
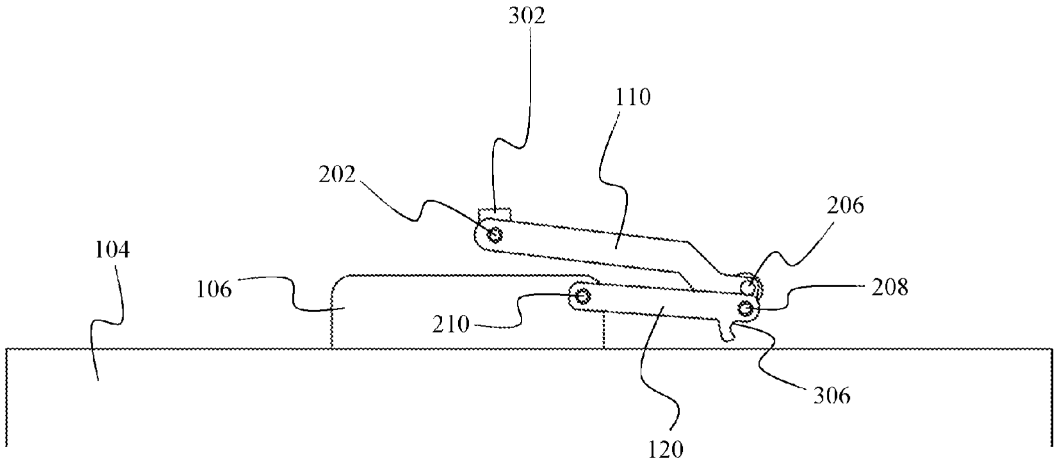
FIG. 3 is a side view of an articulating prop used to prop a vehicle hood wherein the vehicle hood would be in a closed position.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Referring to FIG. 1A, a perspective view of one embodiment of the present invention is shown. In the shown application, an articulating prop is used to prop a vehicle hood 102 relative to a vehicle chassis 104. FIG. 1B shows a close-up view of the articulating prop used between the vehicle hood 102 and the vehicle chassis 104 of FIG. 1A. The articulating prop is further comprised of a first member 110 and a second member 120, which are pivotally fixed to one another by means of an axis of rotation detailed hereafter. The first member 110 further comprises a handle 112, which in this embodiment is generally spherical in shape and rigidly fixed to the first member. This handle is used by a vehicle user to operate the articulating prop. In addition to the articulating prop, a separate hinge 108 is shown to illustrate that while the articulating prop may act as both a hinge and a prop in some applications, it may also be used adjacent to and in conjunction with a separate hinge 108 so that the articulating prop's primary function is only to prop a first body relative to a second body. The separate hinge 108 connects the vehicle hood 102 to the vehicle chassis 104 through hinge assembly bolts 109 used to fix the separate hinge 108 to a vehicle structural frame member 106, which is welded onto the vehicle chassis 104. Like the separate hinge 108, the articulating prop connects the vehicle hood 102 to the vehicle structural frame member 106. The articulating prop shown is in a locked state.

FIG. 2A shows a top-down view of the vehicle hood 102 shown in FIG. 1A, and further shows a dashed line representing the location of a cross-sectional view shown in FIG. 2B. FIG. 2A is included as a reference but does not disclose any new components or an embodiment of the invention. FIG. 2B shows a side view of the embodiment of the present invention shown in FIG. 1A by utilizing a cross sectional view of the vehicle hood 102 as illustrated in FIG. 2A. FIG. 2B is included as a reference for the origins of FIG. 2C. FIG. 2C shows a close up view of FIG. 2B and shows the separate hinge 108 connecting the vehicle hood 102 to the vehicle structural frame member 106. FIG. 2C also shows the first member 110 of the present invention having a first pivotal axis 202 which is pivotally fixed to a first body, which is the vehicle hood 102. The first member 110 and the second member 120 are pivotally fixed to one another by an axis of rotation 208 which is shared by the first member 110 and the second member 120. The first member further comprises a dogleg 204 adjacent the axis of rotation 208 and a protrusion 206 which interfaces with the second member 120 in a manner shown hereafter. The second member 120 further comprises a second pivotal axis 210 which is pivotally fixed to a second body, which is the vehicle structural frame member 106. The articulating prop shown is in a locked state.

FIG. 3 shows the articulating prop of FIG. 2C in an unlocked state. To make the articulating prop more readily visible, the vehicle hood and the separate hinge have been excluded from FIG. 3. The first member is shown to comprise a first pivotal axis which pivotally fixes the first member to a vehicle hood member 302. The articulating prop is in an unlocked state because the protrusion 206 of the first member 110 is shown not mating with a groove 306 of the second member. The groove 306 is of a similar shape to a contour of the protrusion 206, having a circular shape and a radius equal to an outer radius of the cylindrical protrusion 206. The second member 120 is shown pivotally fixed to the vehicle structural frame member 106 through a second pivotal axis 210. The first pivotal axis 202, axis of rotation 208, and the second pivotal axis are the same as those shown in FIG. 2C except that the pivotal or rotational position of each is different, thus causing the relative distance of the first member 110 to the vehicle structural frame member 106 to decrease and the distance of the second member 120 to the vehicle chassis 104 to decrease. Although not shown in this figure, the vehicle hood, to which the vehicle hood member 302 is rigidly fixed, is in a closed state.

Figure 4:
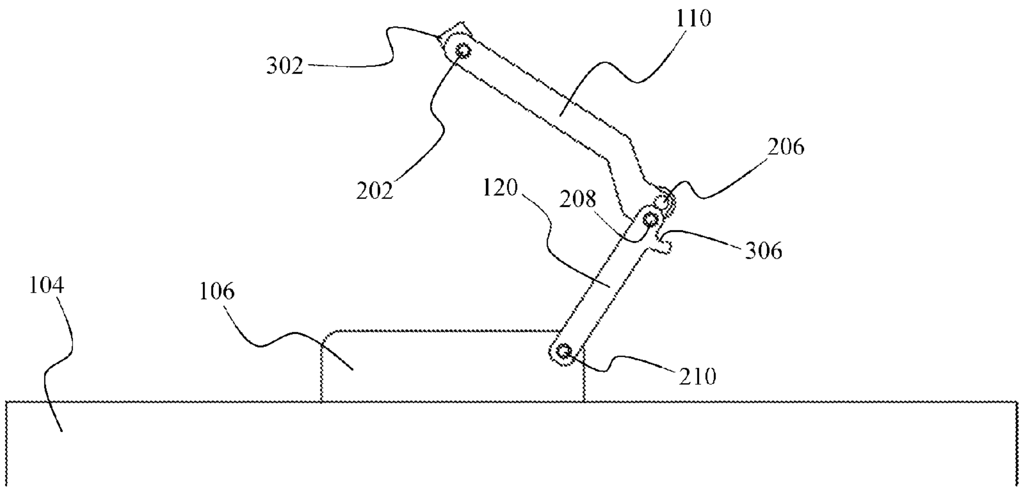
FIG. 4 is a side view of the articulating prop of FIG. 3 wherein the vehicle hood would be in a partially open position.

FIG. 4 shows the articulating prop of FIG. 3 in which the axis of rotation 208 is rotated to a different angle. As in FIG. 3, the vehicle hood is not shown in FIG. 4, with the exception of the vehicle hood member 302 which is pivotally fixed to the first member 110 by a first pivotal axis 202. The vehicle hood is in a partially open state, the rotational angles of the axis of rotation 208, the first pivotal axis 202, and the second pivotal axis 210 to change relative to rotational angles when the vehicle hood is in a closed state as shown in FIG. 3.

Figure 5B:
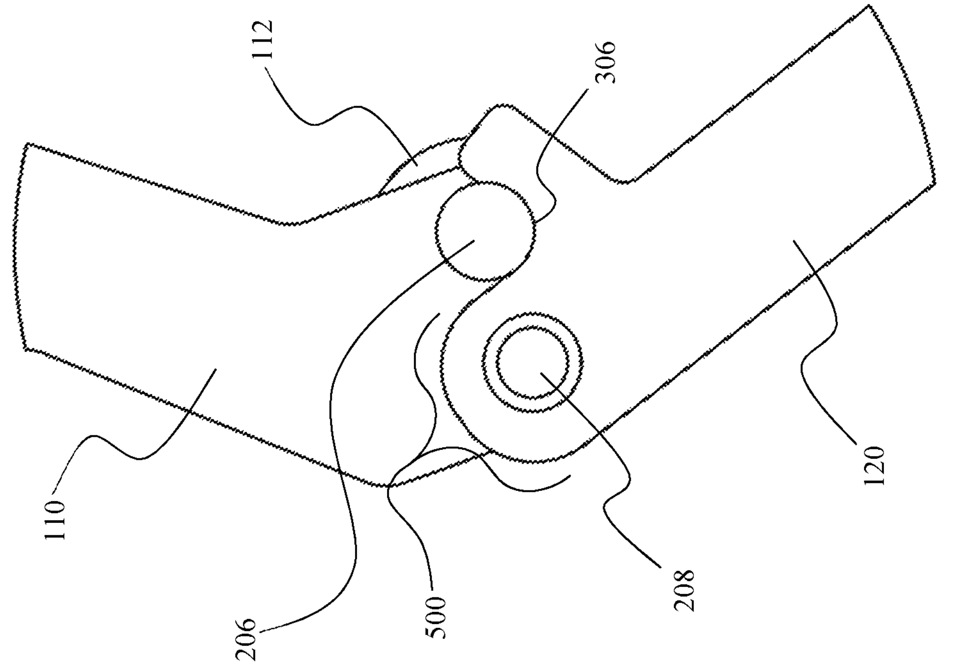
FIGS. 5A and 5B show a side view of the articulating prop of FIG. 4 wherein the articulating prop is in a locked position.
Figure 5A:
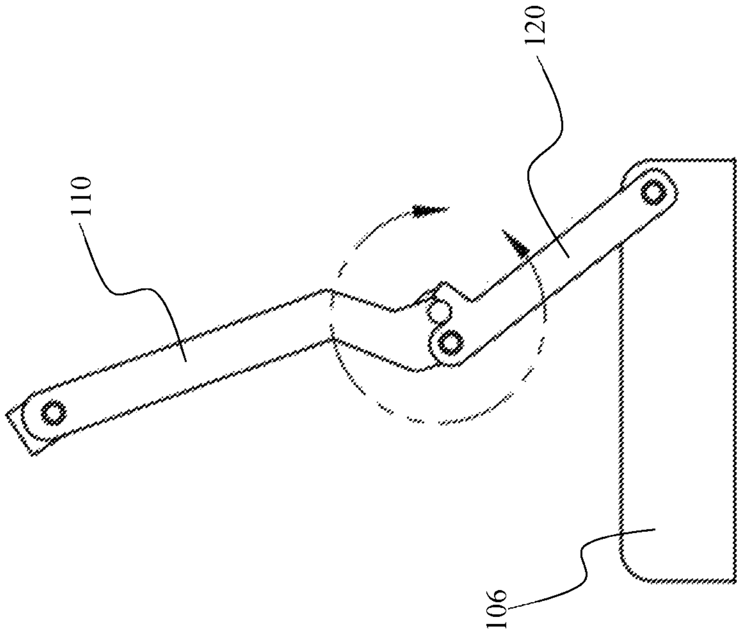

FIG. 5A shows the articulating prop of FIG. 4 in a locked position. FIG. 5A is shown to illustrate the origins of FIG. 5B. FIG. 5B shows a close-up view of the articulating prop in a locked position of FIG. 5A. The first member 110 is pivotally fixed to the second member 120 by means of the axis of rotation 208. The axis of rotation 208 is rotationally fixed. The first member 110 and the second member 120 are locked in position. The protrusion 206 of the first member 110 is mated with the groove 306 of the second member 120, the groove having a radius equal to the outer radius of the protrusion. The second member further comprises a semi-circular end 500 near the axis of rotation 208. The semi-circular end 500 allows the protrusion 206 to move freely about the second member 120 and away from the groove 306.

Figure 6:
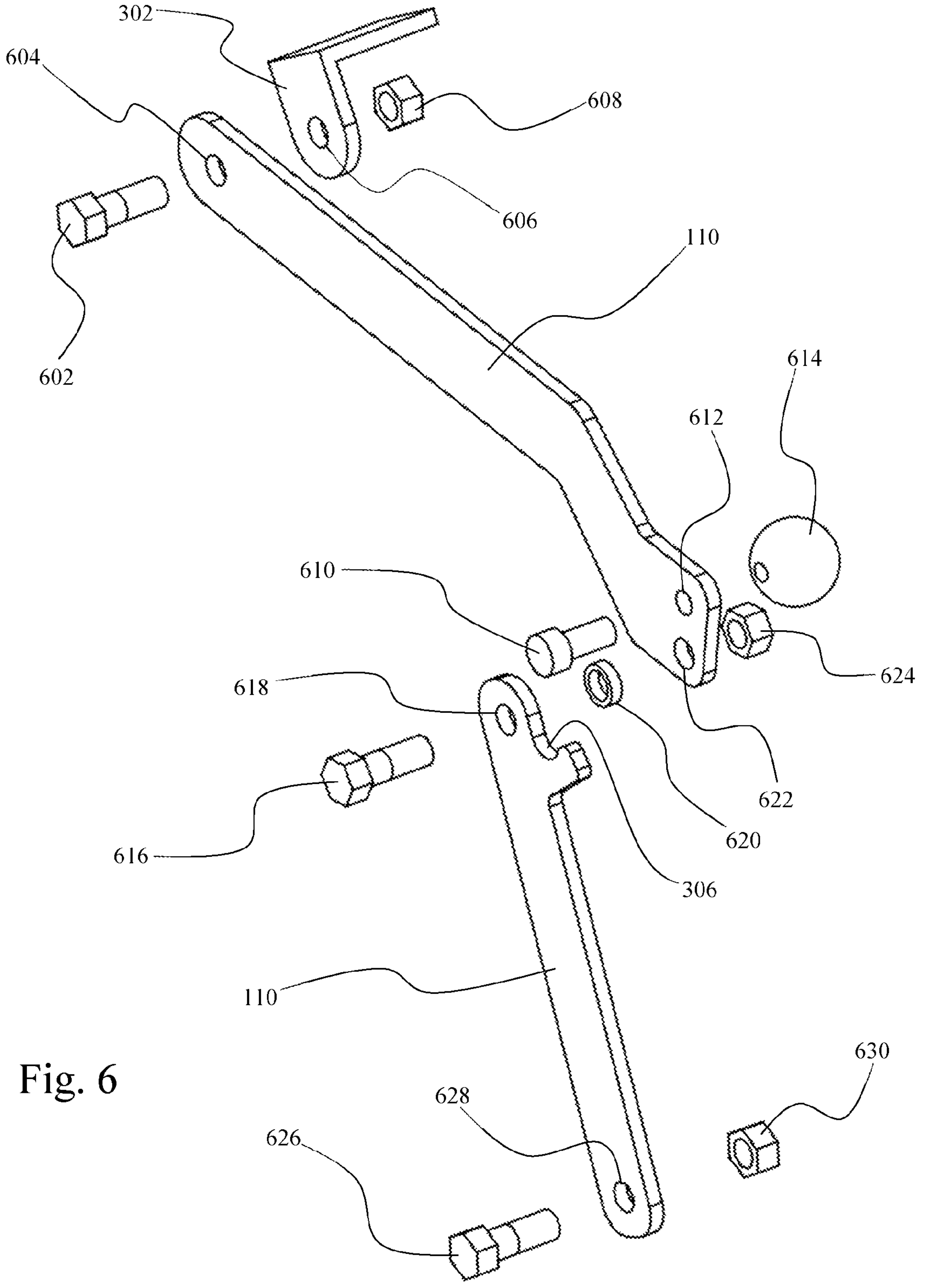

FIG. 6 shows an exploded view of the articulating prop shown in FIG. 5A. The first member 110 is shown to further comprise a first opening of the first member 604, a second opening of the first member 622, and a third opening of the first member 612. The vehicle hood member 302 has a vehicle hood member opening 606. The first pivotal axis comprises a first pivotal axis bolt 602 inserted through the first opening of the first member 604 and the vehicle hood member opening 606 and then secured using a first pivotal axis nut 608. The protrusion of the first member 110 further comprises a first bolt 610 inserted into the third opening of the first member 612 and then inserted into a threaded handle 614. The first bolt 610 interfaces with the groove 306 of the second member 120. The second member 120 is shown to further comprise a first opening of the second member 628 and a second opening of the second member 618. The axis of rotation further comprises an axle comprised of a second bolt 616 inserted into the second opening of the second member 618, inserted into a spacer 620, inserted into the second opening of the first member 622, and then secured using a an axis of rotation nut 624. The spacer 620 separates the first member 110 and the second member 120. The axis of rotation bolt 616 and spacer 620 allow the first member 110 and the second member 120 to rotate about the axis of rotation. The second pivotal axis comprises a second pivotal axis bolt 626 inserted into the first opening of the second member 628 and then secured using a second pivotal axis nut 630.

Figure 7:
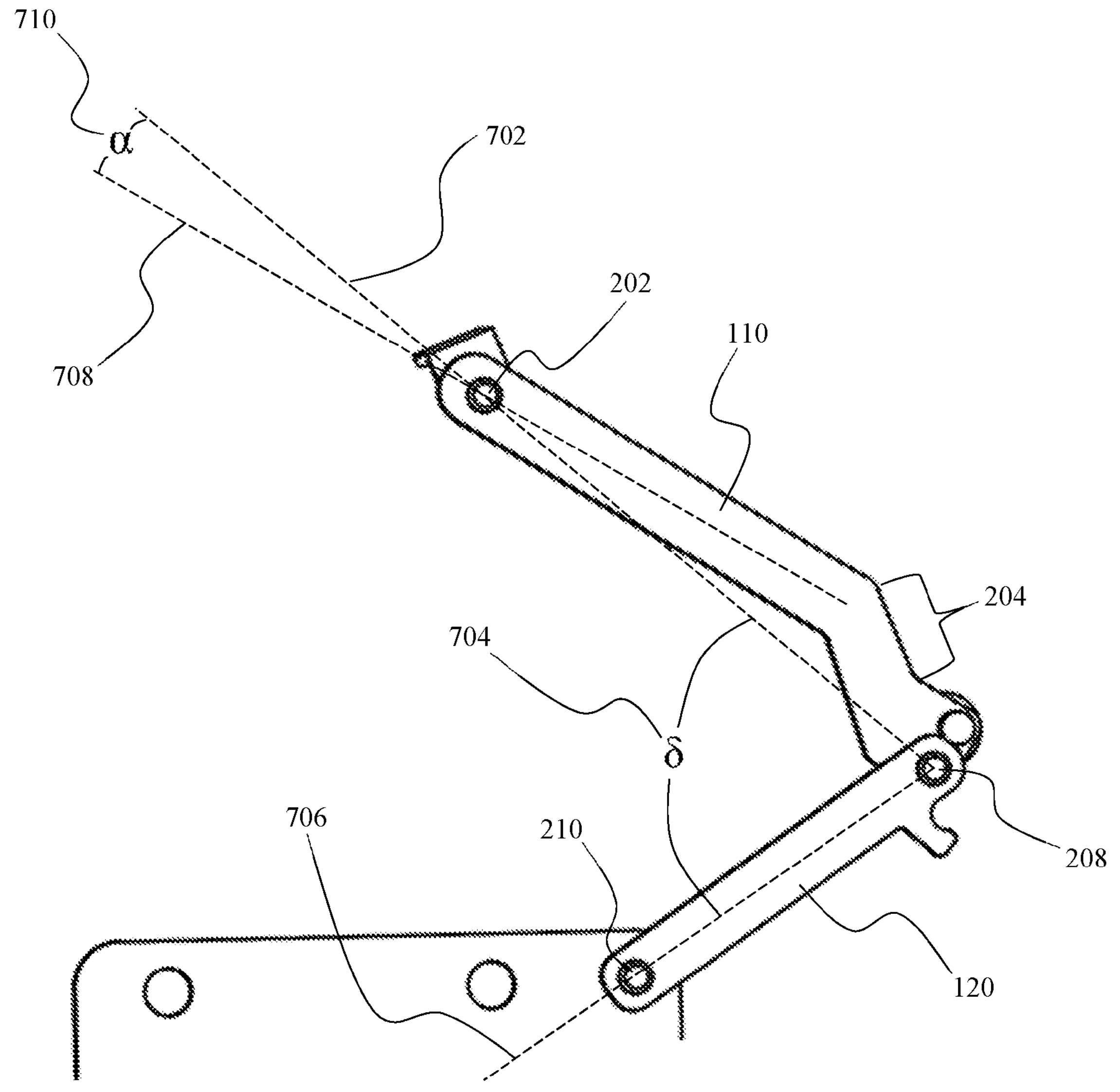
FIG. 7 shows a side view of the articulating prop and angles associated with the articulating prop's performance.

FIG. 7 shows a side view of the articulating prop shown in FIG. 6. The first member 110 and the second member 120 are joined at the axis of rotation 208. A first axis 702 is formed between the first pivotal axis 202 of the first member 110 and the axis of rotation 208. A second axis 706 is formed between the second pivotal axis 210 of the second member 120 and the axis of rotation 208. The first member 110 and the second member 120 rotate around the axis of rotation such that a first angle 704 is formed between the first axis 702 and the second axis 706. The first angle 704 represents a rotational range of motion for the axis of rotation 208 and can be between −5 degrees and 200 degrees, where −5 degrees occurs when the vehicle hood is closed and 200 degrees occurs when the hood is open and the articulating prop is in its locked state. A third axis 708 is formed between the first pivotal axis 202 and the centroid of the first member 110 up to the dogleg 204 of the first member 110. A second angle 710 is formed between the first axis 702 and the third axis 708. The second angle 710 increases as the length of the dogleg 204 increases, and the dogleg 204 serves to increase the range of possible first angles 704 beyond 180 degrees, thus also increasing the range of motion of the axis of rotation 208 beyond 180 degrees.

Figure 8:
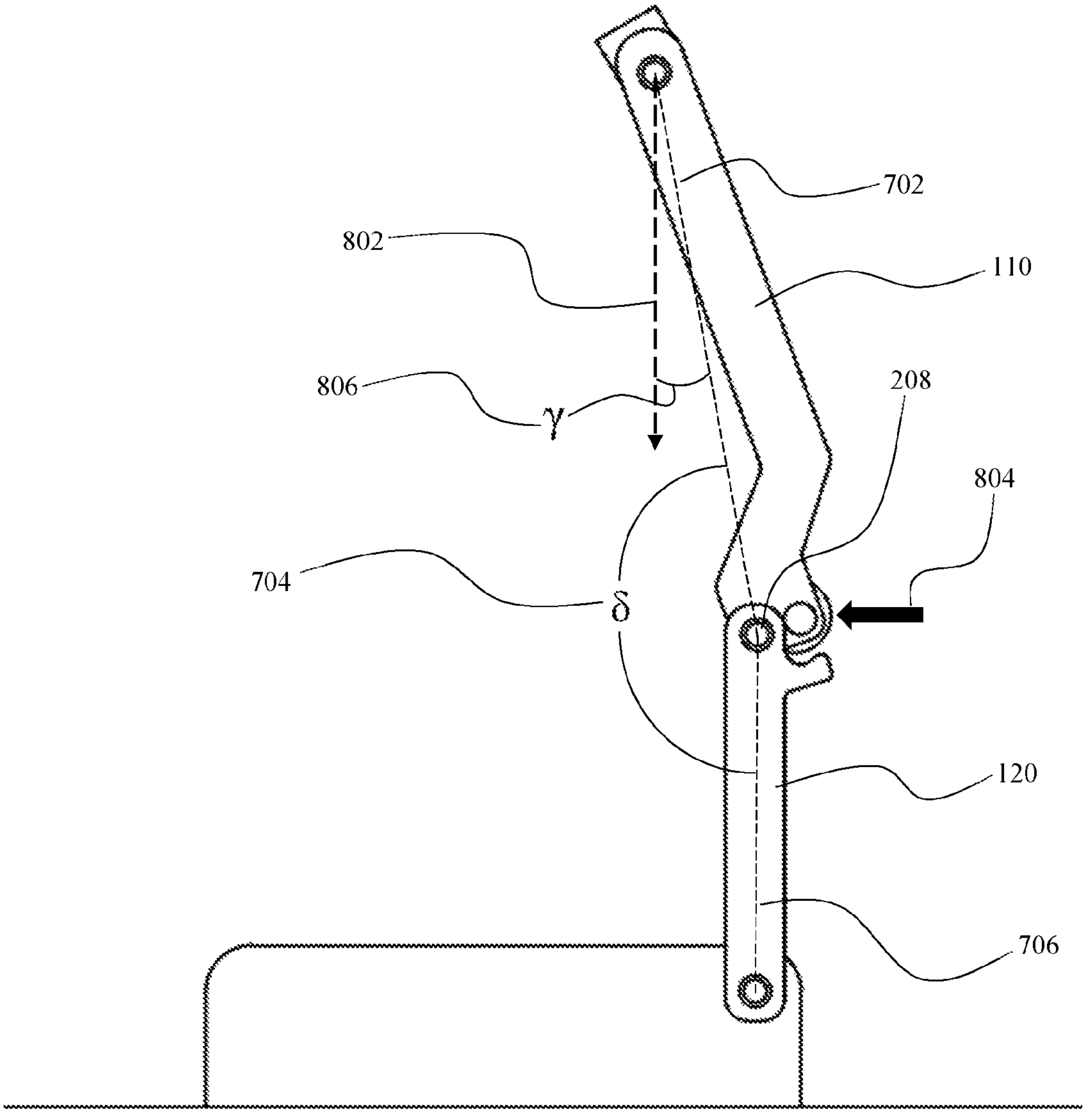
FIG. 8 shows a side view of the articulating prop in an unlocked position and a first external force used to lock the prop.

FIG. 8 shows a side view of the articulating prop of FIG. 7 in an unlocked state. A user typically opens a vehicle hood by lifting the hood until it reaches a certain height and then propping it. The separate hinge shown in FIG. 1B and the articulating prop will allow a user to lift the vehicle hood up to a maximum height. At this maximum height, the weight of the vehicle hood 802 acts in a vertically downward direction. Should a user discontinue counteracting the weight of the vehicle hood 802 by lifting it, the weight of the vehicle hood 802 would cause the first member 110 and the second member 120 to rotate about the axis of rotation 208 such that the first angle 704 would decrease and the hood would fall closed. This decrease in the first angle 704 is caused by a positive third angle 806 which is formed between the direction of the weight of the vehicle hood 802 and the first axis 702. In order to prop the hood in an open position such that no external force is required to maintain the open position of the vehicle hood, the third angle 806 must be decreased such that it becomes negative. To accomplish this, when the vehicle hood is lifted up to its maximum height, a first external force 804 in a first direction must be applied to the handle of the first member 110. The first external force will increase the first angle 704, decrease the third angle 806, and cause the articulating prop to prop the vehicle hood in an open position. The locked position is further described in FIG. 9.

Figure 9:
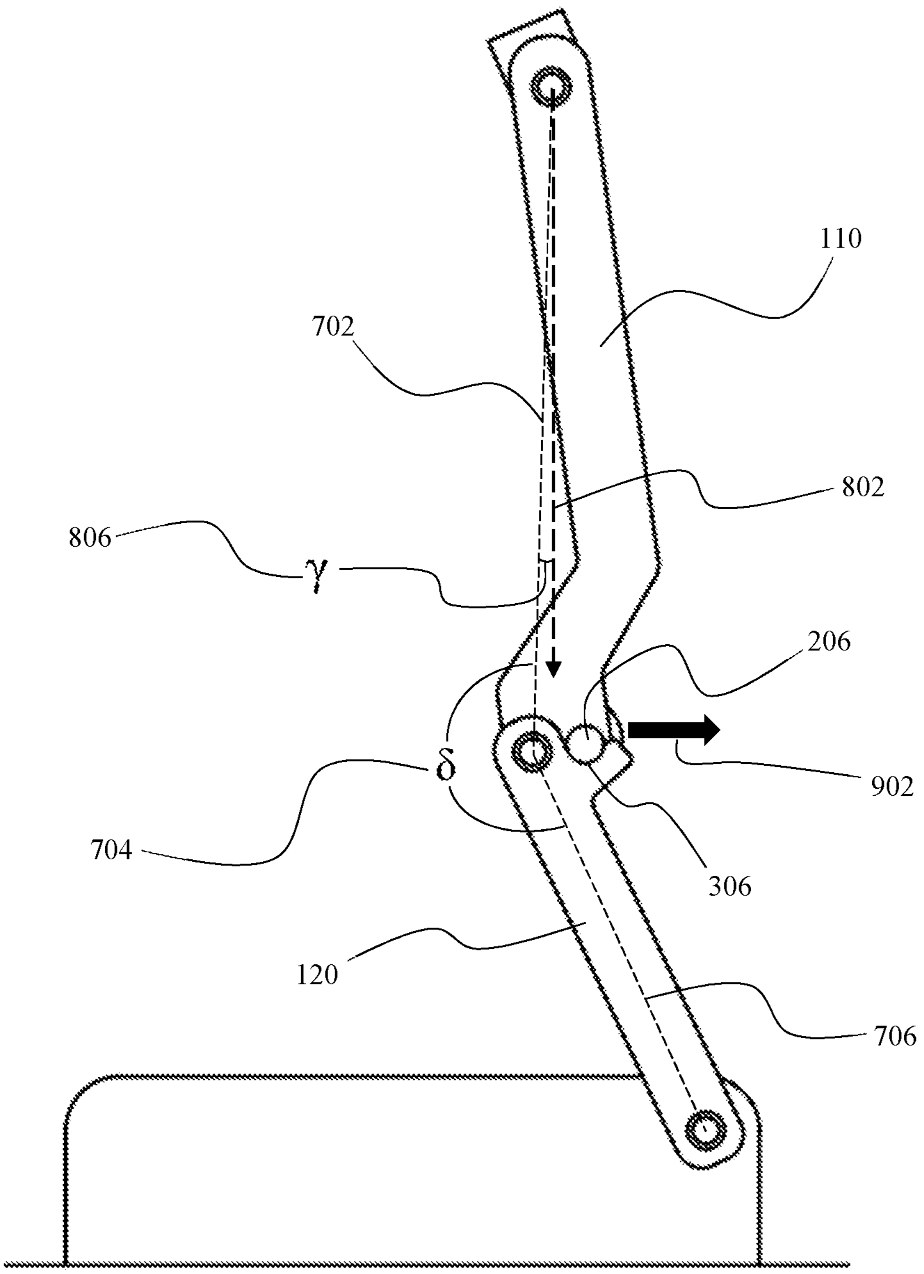
FIG. 9 shows a side view of the articulating prop in a locked position and a second eternal force used to unlock the prop.

FIG. 9 shows a side view of the articulating prop of FIG. 8 in a locked state. After a first external force is applied in a first direction as detailed in FIG. 8, the third angle 806 becomes negative, the first angle 704 becomes greater than 180 degrees, and the protrusion 206 mates with the groove 306. No additional external force is required to maintain the locked state of the first member 110 and the second member 120 of the articulating prop because the weight of the vehicle hood 802 exerts a force that would tend to increase the first angle 704. This force is counteracted by the groove 306 mating with the protrusion 206 and thus preventing any further increase of the first angle 704. In order to unlock the first member 110 and the second member 120 from a locked state, a second external force 902 in a second direction must be applied to the handle that decreases the first angle 704 and increases the third angle 806 from a negative angle to a positive angle.

Figure 10:
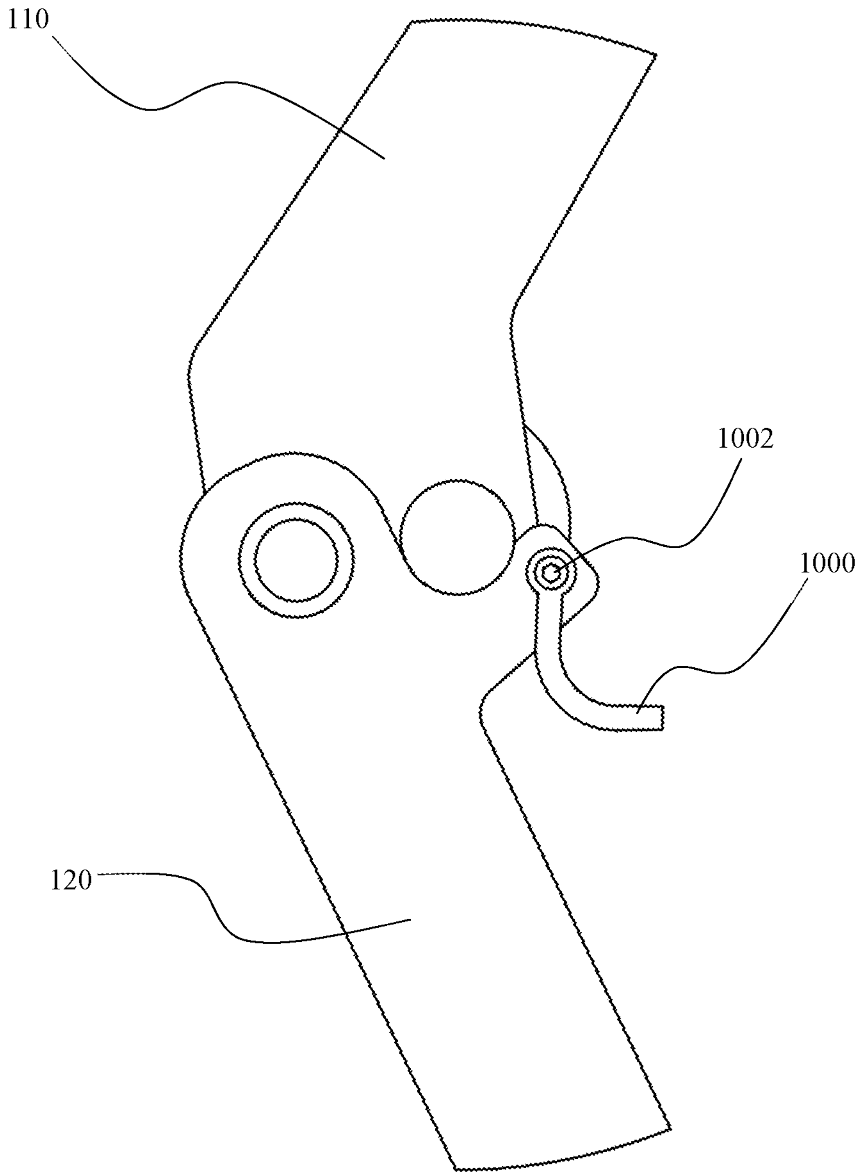
FIG. 10 shows a second embodiment of the articulating prop utilizing a latch in an unlocked position.

FIG. 10 shows a side view of a second embodiment of the present invention wherein the second member 120 further comprises a third pivotal axis 1002 and a latch 1000, the latch being pivotally fixed to the second member at the third pivotal axis. The latch is in an open position and can be closed to lock the first member to the second member in a manner shown hereafter.

Figure 11:
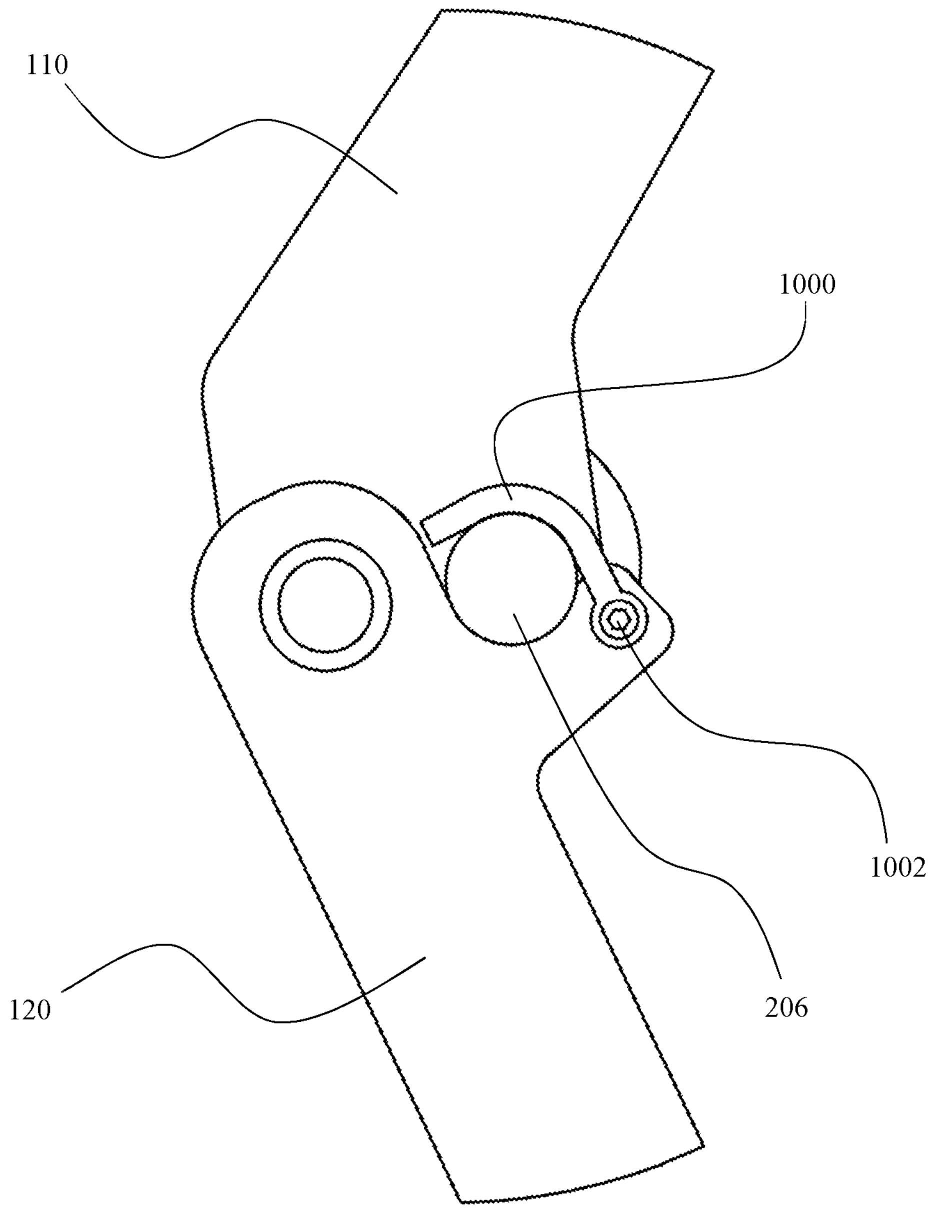
FIG. 11 shows the second embodiment of the articulating prop utilizing a latch in a locked position.

FIG. 11 shows a side view of the second embodiment of the present invention shown in FIG. 9 wherein the latch 1000 is in a closed position. The latch 1000 is rotated about the third pivotal axis 1002 until the latch 1000 mates with the surface of the protrusion 206. As shown in FIG. 11, the latch 1000 is shaped such that it fits the shape of the protrusion. The latch 1000 acts as a secondary locking mechanism to maintain the first member 110 and the second member 120 in their locked positions. The latch 1000 strengthens the locking power of the articulating prop to withstand unexpected external forces caused by accidental human interactions or wind.

Figure 12:
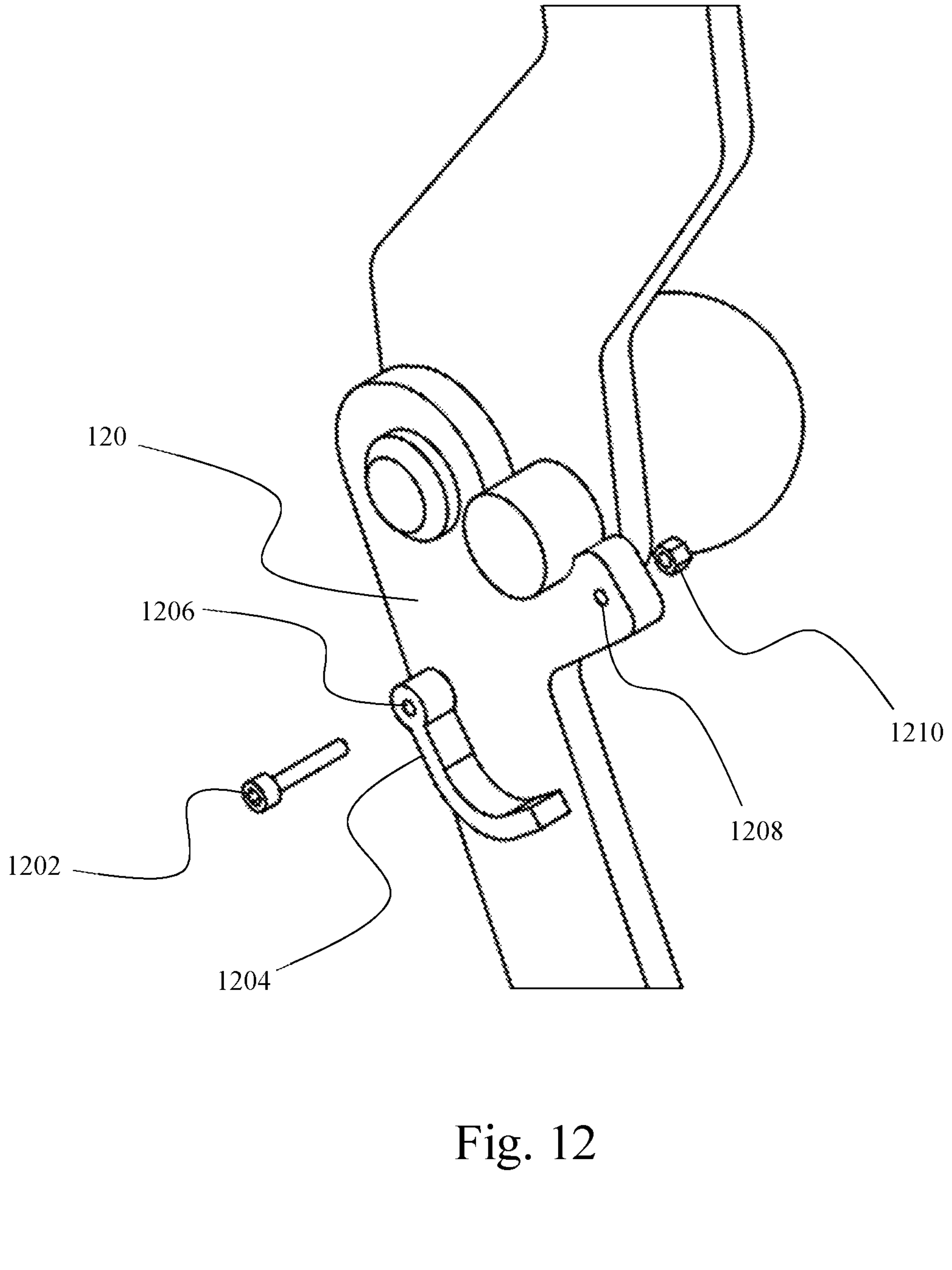
FIG. 12 shows an exploded view of the second embodiment of the articulating prop.

FIG. 12 shows a perspective exploded view of the second embodiment of the present invention. In this embodiment, the second member 120 further comprises a sixth opening 1208. The third pivotal axis further comprises a latch screw 120 inserted into a latch opening 1206 in the latch 1204, then inserted into the sixth opening 1208 and secured using a latch nut 1210.

Figure 13:
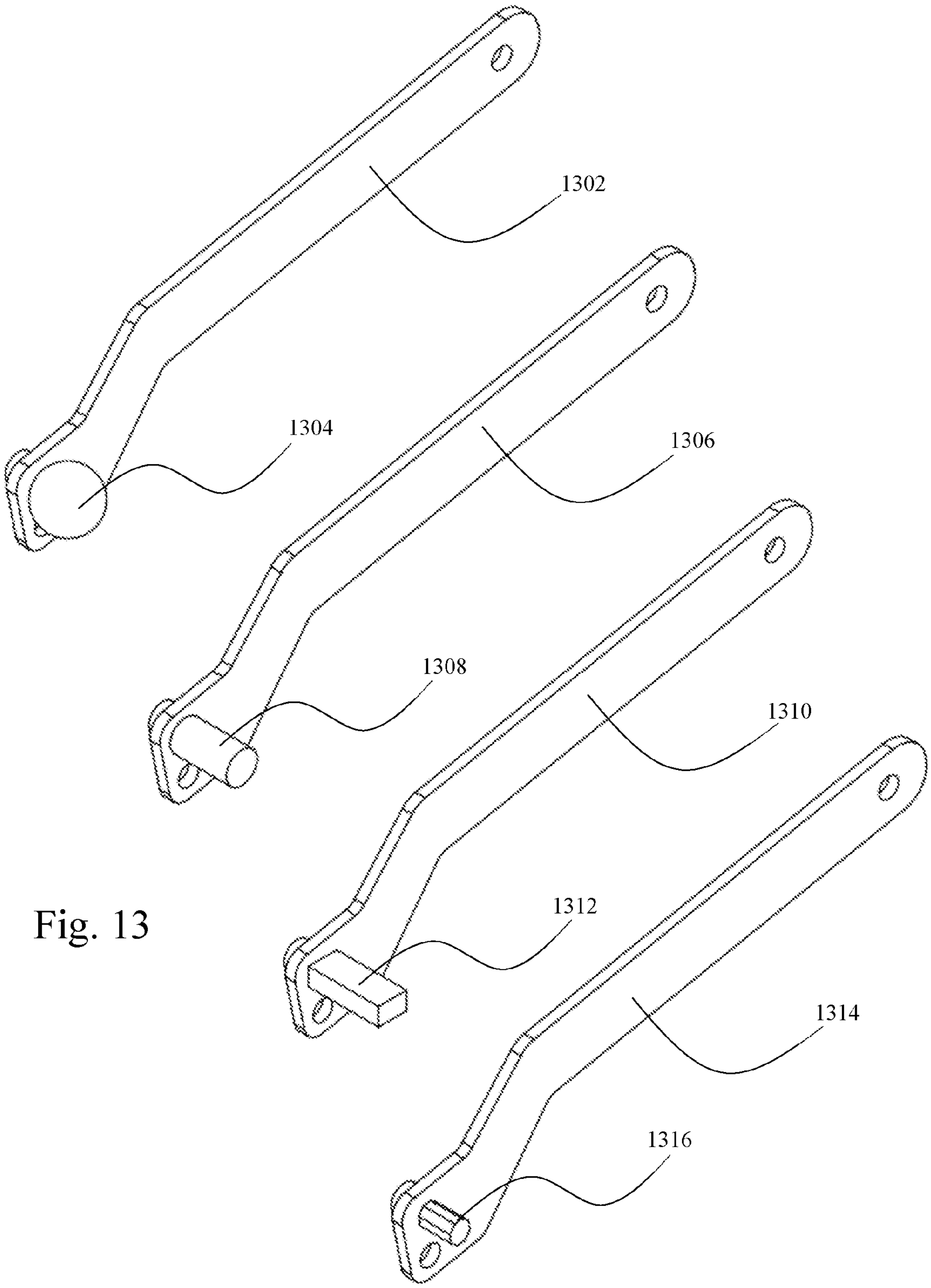
FIG. 13 shows four illustrative shapes of handles utilized in the articulating prop.

FIG. 13 shows a perspective view of four first members 1302, 1306, 1310, 1314 each having different handles 1304, 1308, 1312, 1316 of different shape. First member 1302 comprises a handle 1304 of spherical shape. First member 1306 comprises a handle 1308 of cylindrical shape. First member 1310 comprises a handle 1312 of rectangular prismatic shape. First member 1314 comprises a handle 1316 of polyhedral shape. The handle shapes shown are understood to be illustrative of the various shapes the handle of the present invention may comprise and are not restrictive to only the shapes shown herein.

Figure 14:
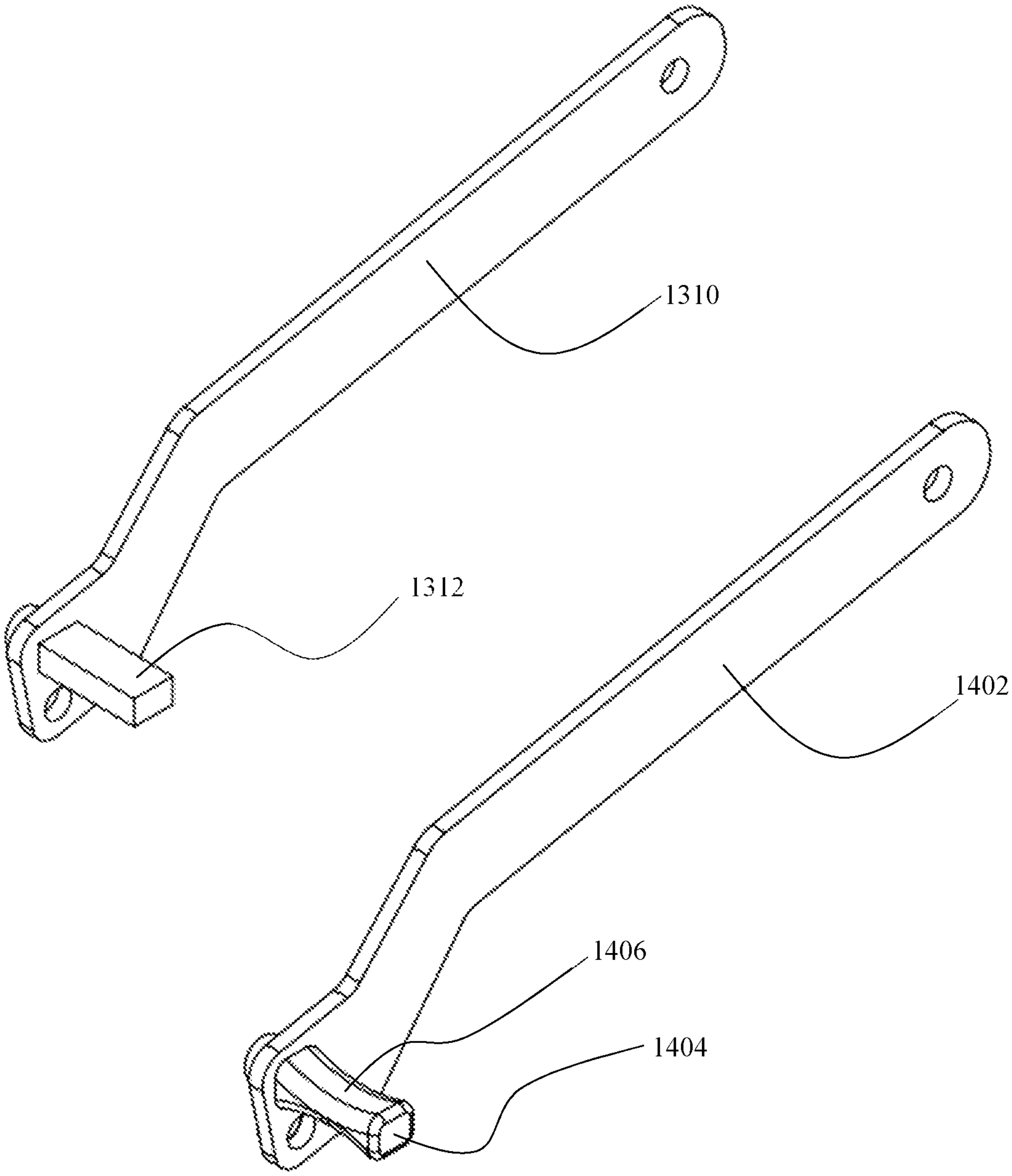
FIG. 14 shows two illustrative shapes of handles utilized in the articulating prop, one of which comprises curved surfaces.

FIG. 14 shows a perspective view of two first members 1310, 1402 having different handles 1312, 1404. First member 1310 comprises a handle 1312 of a rectangular prismatic shape. First member 1402 comprises a handle 1404 originally of a rectangular prismatic shape with curved interfaces 1406. The curved interfaces 1406 on and between sides of the handle 1404 provide a user with a more comfortable grip, thus making the articulating prop a more comfortable device for the user to interact with.

The apparatus disclosed herein may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A locking mechanism for an articulating prop comprising:

a first member comprising a handle, a protrusion, and a first pivotal axis which is pivotally fixed to a first body; and a second member comprising a groove and a second pivotal axis which is pivotally fixed to a second body, the first member and the second member being joined at an axis of rotation, wherein the axis of rotation allows the protrusion to engage the groove, wherein a first external force in a first direction substantially antinormal to the articulating prop and applied to the handle locks the first member and the second member in position, and wherein a second external force applied in a second direction substantially normal to the articulating prop and applied to the handle unlocks the first member and the second member of mechanism for the articulating prop, and wherein while the first member and the second member are locked in position, a force in a third direction substantially parallel to the articulating prop and applied by the first body or the second body does not unlock the first member and the second member.

2. The locking mechanism for the articulating prop of claim 1, wherein the first body is a hood of a vehicle.

3. The locking mechanism for the articulating prop of claim 1, wherein the second body is a vehicle structural frame member.

4. The locking mechanism for the articulating prop of claim 1, wherein the first pivotal axis of the first member comprises a first opening and the axis of rotation comprises a second opening, the first opening being at an opposed end of the first member to the second opening and the protrusion.

5. The locking mechanism for the articulating prop of claim 4, wherein the protrusion further comprises a first bolt through a third opening in the first member, the handle being rigidly attached to the first bolt.

6. The locking mechanism for the articulating prop of claim 1, wherein the second pivotal axis of the second member comprises a first opening and the axis of rotation comprises a second opening, the first opening being on an opposed side of the second member to the second opening.

7. The locking mechanism for the articulating prop of claim 1, wherein a weight of the first body acts on the groove of the second member through the protrusion of the first member.

8. The locking mechanism for the articulating prop of claim 1, wherein the first second member further comprises a semi-circular end, the axis of rotation being near the semi-circular end.

9. The locking mechanism for the articulating prop of claim 6, wherein the second member further comprises a third pivotal axis and a latch, the latch being pivotally fixed to the second member at the third pivotal axis and the latch being shaped to fit a contour of the protrusion.

10. The locking mechanism for the articulating prop of claim 1, wherein the handle has a general shape selected from the group of shapes consisting of a sphere, a cylinder, a rectangular prism, and a polyhedron.

11. The locking mechanism for the articulating prop of claim 10, wherein the handle further comprises curved interfaces.

12. The locking mechanism for the articulating prop of claim 1 wherein the axis of rotation comprises an axle.

13. The locking mechanism for the articulating prop of claim 12, wherein the axle of the axis of rotation further comprises a second bolt and a spacer, the second bolt passing through and pivotally fixing the second member, the spacer, and the first member, the first member and the second member being separated by the spacer.

14. The locking mechanism for the articulating prop of claim 1, wherein the first member and the second member are comprised at least partially of aluminum, steel, a polymer, carbon fibers, or a combination thereof.

15. The locking mechanism for the articulating prop of claim 1, wherein the first member and the second member are at least partially manufactured by laser-cutting, water-jet cutting, casting, injection molding, extruding, forging, stamping, milling, or drilling.

16. The locking mechanism for the articulating prop of claim 1, wherein the groove is circular in shape and the protrusion is cylindrical in shape, the groove having a radius equal to an outer radius of the protrusion.

17. The locking mechanism for the articulating prop of claim 1, wherein the axis of rotation has a range of motion between −5 degrees and 200 degrees.

18. The locking mechanism for the articulating prop of claim 1, wherein the first member comprises a dogleg, the axis of rotation extending through at least a portion of the dogleg.

* * * * *